United States Patent [19]

Mueller et al.

[11] Patent Number: 5,311,502
[45] Date of Patent: May 10, 1994

[54] METHOD FOR MAINTAINING CONNECTIONS GIVEN AN AT LEAST PARTIAL OUTAGE OF CONNECTING PATHS

[75] Inventors: Bernd-Michael Mueller, Ottobrunn; Wolfgang Sitter, Munich, both of Fed. Rep. of Germany

[73] Assignee: Siemens Aktiengesellschaft, Munich, Fed. Rep. of Germany

[21] Appl. No.: 936,637

[22] Filed: Aug. 28, 1992

[30] Foreign Application Priority Data

Aug. 30, 1991 [DE] Fed. Rep. of Germany ....... 4128939

[51] Int. Cl.$^5$ ............................................. H04L 12/56
[52] U.S. Cl. .......................................... 370/16; 370/60
[58] Field of Search ................... 370/16, 54, 58.1, 60, 370/60.1, 68.1, 94.1, 110.1, 119; 379/221

[56] References Cited

U.S. PATENT DOCUMENTS

| 5,084,867 | 1/1992 | Tachibana et al. | 370/60 |
| 5,182,750 | 1/1993 | Bales et al. | 370/16 |

*Primary Examiner*—Benedict V. Safourek
*Attorney, Agent, or Firm*—Hill, Steadman & Simpson

[57] ABSTRACT

Method for maintaining virtual connections given an at least partial outage of connecting paths. Given the occurrence of a connection disturbance, a virtual connection initially set up within a first packet switching network (PVN1) is cleared down proceeding from the disturbed location up to the originating and destination switching equipment (Verm1, Verm2). Upon employment of a specifically generated call request, a new virtual connection proceeding from the originating switching center (Verm1) is then set up between the originating and destination switching equipment of the first packet switching network (PVN1) via an alternate route upon involvement of a second packet switching network (PVN2).

9 Claims, 3 Drawing Sheets

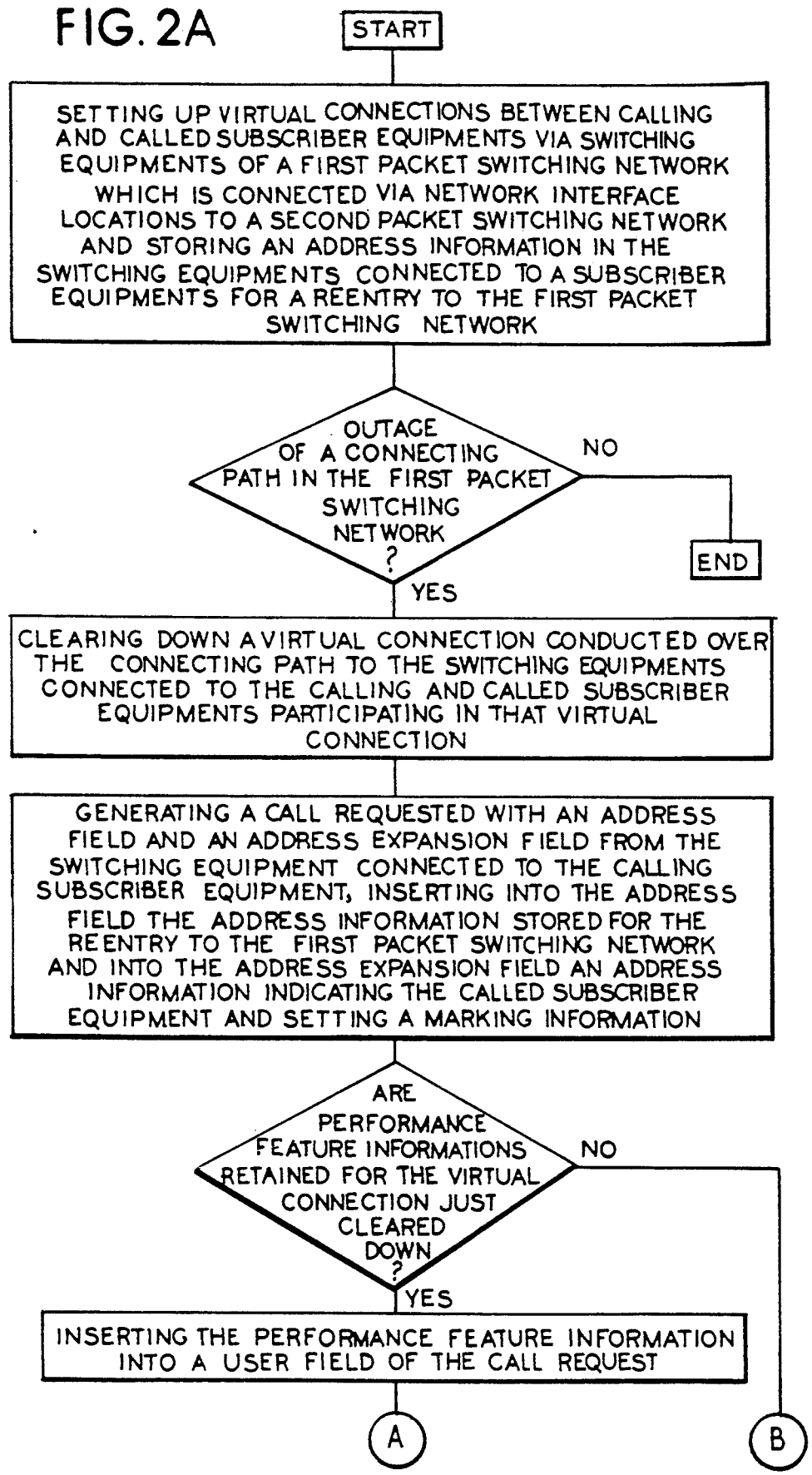

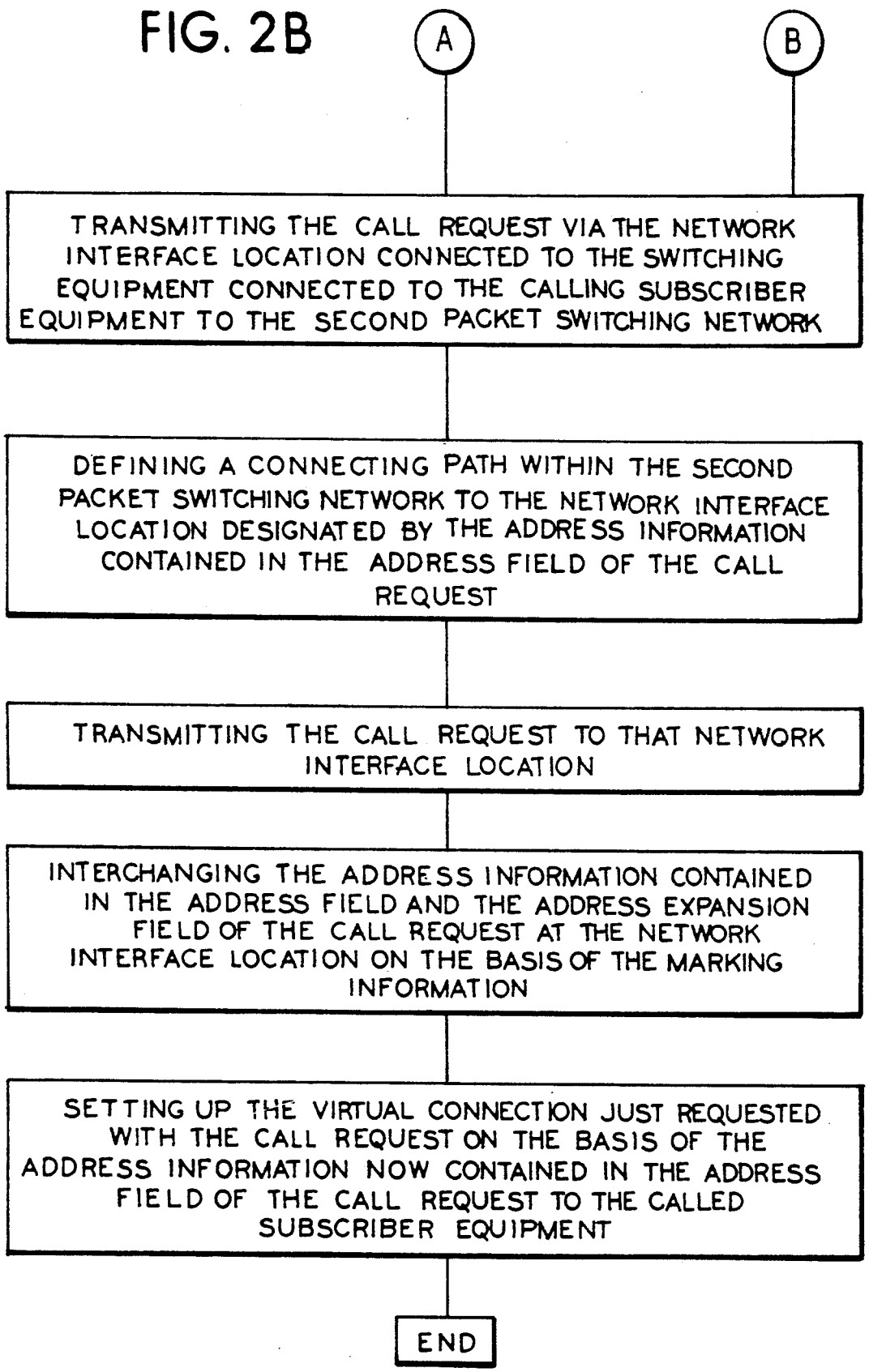

METHOD FOR MAINTAINING CONNECTIONS GIVEN AN AT LEAST PARTIAL OUTAGE OF CONNECTING PATHS

BACKGROUND OF THE INVENTION

The present invention is directed to a method for maintaining virtual connections between calling and called subscriber equipment given at least a partial outage of connecting paths defined for the virtual connections.

In telecommunication switching networks it is usually possible to connect network interfaces to one another to produce internal connections between subscriber equipment of one and the same telecommunication switching network, as well as, to produce external connections between subscriber equipment of different telecommunication switching networks using the network interfaces. The respective type of connection defined from calling subscriber equipment by transmitting appropriate signalling information, for example in the form of selection digits. In the case of packet switching networks that are connected to one another by network interfaces, the request for an internal or external virtual connection can be provided from calling subscriber equipment in that an address information specifying the respective type of connection in an address field of a call request packet serving the purpose of initiating a call set up, is transmitted to the switching equipment that is connected to the appertaining calling subscriber equipment.

SUMMARY OF THE INVENTION

It is an object of the present invention to provide a method for maintaining virtual connections set up in a first packet switching network upon involvement of a second packing switching network given an at least partial outage of connecting paths.

This object is achieved by a method of the present invention for maintaining virtual connections existing between calling and called subscriber equipment of a first packet switching network given an at least partial outage of connecting paths defined for the virtual connections within the first packet switching network. The individual connecting paths proceed via a plurality of switching equipment belonging to the first packet switching network and at least one network interface location is respectively provided at least between switching equipment connected to subscriber equipment and a second packet switching network. The method of the present invention has the following steps:

at least respectively one address information indicating a network interface location coming into consideration for a reentry into the first packet switching network is stored in the switching equipment of the first packet switching network connected to the subscriber equipment;

given outage of a connecting path within the first packet switching network, the virtual connection respectively conducted thereover is only cleared down to the switching equipment participating therein and connected to the calling subscriber equipment and to the called subscriber equipment;

in response to such a partial clear down, a call request requesting the setup of a virtual connection is generated proceeding from the switching equipment connected to the calling subscriber equipment and is transmitted to the second packet switching network via the network interface location connected to the appertaining switching equipment, whereby an address expansion field is provided in the call request in addition to an address field and defined marking information is set;

at least after the appertaining network interface location, address information indicating the network interface location coming into consideration for the virtual connection now to be set up is entered in the address field in the transmitted call request and in the address information for the called subscriber equipment participating in the virtual connection just partially cleared down is entered in the address expansion field;

based on the address information contained in the addressed field of the call request and indicating the network interface location coming into consideration for the reentry into the first packet switching network, a connecting path to the appertaining network interface location is defined in the second packet switching network and the call request is conducted thereto;

on the basis of the marking information set in the call request, the address information respectively contained in the appertaining address field and in address expansion field are interchanged with one another at the appertaining network interface location; and based on the address information now contained in the address field of the call request and indicating the called subscriber equipment, the virtual connection requested with the call request is set up to the switching equipment connected to the appertaining, called subscriber equipment.

An advantage of the present invention is that virtual connections initially set up in the first packet switching network are automatically maintained via an alternate route upon involvement of the second packet switching network given an at least partial outage of connecting paths without the subscriber equipment participating in the respective virtual connection receiving knowledge about the disturbance that has occurred in the connection.

The following are advantageous developments of the present invention. At least one network interface location is provided between each of the switching equipment of the first packet switching network and the second packet switching network. Respective address information with respect to all network interface locations coming into consideration for a reentry into the first packet switching network ar stored in the switching equipment of the first packet switching network connected to subscriber equipment. A network interface location coming into consideration for the reentry into the first packet switching network is selected (for generating a call request) by the switching equipment coming into consideration and based on the address information indicating the called subscriber equipment. The address information indicating this network interface location is transferred into the call request to be generated.

Performance feature information associated with a partially cleared down virtual connection, which is retained for the appertaining virtual connection in the switching equipment generating a call request and that is to be transmitted to the switching equipment of the first packet switching network connected to the called subscriber equipment, is inserted into a user data field of the appertaining call request.

The first packet switching network can be a private packet switching network and the second packet switching network ca be a public packet switching network.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numbers identify like elements, and in which:

FIGS. 2A and 2B are flowcharts of the method of the present invention.

DESCRIPTION OF THE PREFERRED EMBODIMENT

Figure 1:
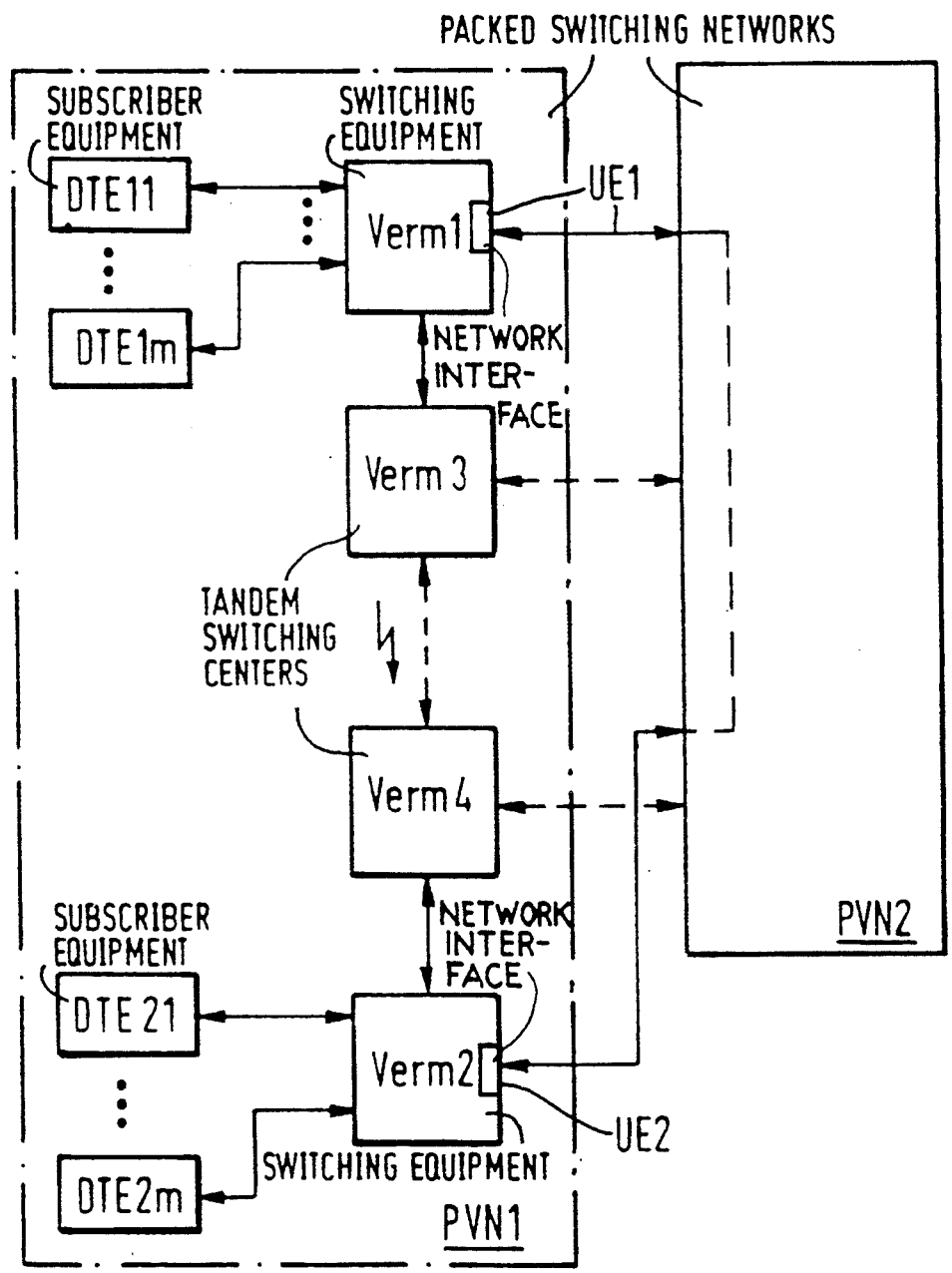
FIG. 1 shows a block circuit diagram of packet switching networks connected to one another by network interfaces, the present invention being employed therein.

FIG. 1 shows two separate packet switching networks PVN1 and PVN2 that are connected to one another by network interface locations UE1 and UE2. Let the packet switching network PVN1 thereby be, for example, a private packet switching network and, by contrast, let the packet switching network PVN2 be a public packet switching network. Let switching equipment Verm1 as well as a switching equipment Verm2 thereby belong to the packet switching network PVN1, a plurality of subscriber equipment being assumed to be respectively connected to this switching equipment. This subscriber equipment is referenced DTE11 through DTE1m or, respectively, DTE21 through DTE2m in accord with their affiliation to the two switching equipment. A transmission of signalling packets for setting up virtual connections and a transmission of data packets given existing virtual connections thereby respectively occurs between these subscriber equipment and the appertaining switching equipment according to CCITT Recommendation X.25. According to this CCITT Recommendation, signalling packets and data packets are also exchanged between the two packet switching networks PVN1 and PVN2 via the two afore-mentioned network interface locations UE1 and UE2.

The two switching equipment Verm1 and Verm2, which can each respectively carry out originating as well as destination switching functions, are in communication with one another via one or more trunk lines, whereby these trunk lines can be conducted via tandem switching centers. Such tandem switching centers are referenced Verm3 and Verm4 in FIG. 1. The transmission of signalling packets and data packets over the trunk lines occurs according to CCITT Recommendation X.75.

The fundamental structure of the packet switching network PVN1 as well as the coupling thereof to the packet switching network PVN2 having been set forth above, the method of the present invention shall now be discussed in greater detail and is illustrated by the flowchart in FIGS. 2A and 2B. To that and, let it be assumed as an example that a virtual connection is to be set up between the subscriber equipment DTE11 and DTE21. For this call set up, a call request proceeding from the calling subscriber DTE11 is transmitted to the switching equipment Verm1 according to CCITT Recommendation X.25. Address information with which the subscriber equipment DTE21 is identified as called subscriber equipment is thereby contained in an address field of this call request. Based on this address information, the switching equipment Verm1 then initiates a path search for a suitable connecting path within the packet switching network PVN1 to the switching equipment Verm2. When such a connecting path is defined, for example upon involvement of the switching equipment Verm3 and Verm4, then the remainder of the call set up occurs by exchanging signalling packets between the switching equipment Verm1 through Verm4 and the subscriber equipment DTE11 and DTE21 participating in the virtual connection to be now set up. This occurs according to CCITT Recommendation X.75 or, respectively, X.25.

When a disturbance in the connection then arises in the afore-mentioned virtual connection, for example due to an interruption of one of the trunk lines provided between the switching equipment Verm1 and Verm2, then, as shall be set forth in detail below, an alternate route is selected upon involvement of the packet switching network PVN2. As indicated in FIG. 1,, let such an interruption be present, for example, between the switching equipment Verm3 and Verm4. For selecting such an alternate route, the virtual connection that has been setup up to this point in time is first cleared down by the switching equipment Verm3 up to the switching equipment Verm1, on the one hand, and, on the other hand, by the switching equipment Verm4 up to the switching equipment Verm2, i.e. the calling subscriber equipment DTE11 connected to the switching equipment Verm1 and the called subscriber equipment DTE21 connected to the switching equipment Verm2 are not affected by this clear down. Moreover such a partial clear down of the virtual connection that was previously set up, is achieved by a specific clear request respectively output by the two switching equipment Verm3 and Verm4 according to CCITT Recommendation X.75.

The appearance of the above-described clear request in the switching equipment Verm1 generates a call request that requests the set up of a virtual connection wherein an address expansion field is also provided in addition to an afore-mentioned address field. Address information indicating the called subscriber equipment DTE21 is entered into this address expansion field. This address information is still deposited in the switching equipment Verm1 by the setup of the virtual connection that has just been partially cleared down. Address information indicating the network interface location UE2, by contrast, is transferred into the address field of the call request itself, this address information being deposited in the data base of the switching equipment Verm1. In addition, marking information is entered into the call request.

The call request generated in this way is then transmitted via the network interface location UE1 to the packet switching network PVN2. Based on the address information contained in the address field and indicating the network interface location UE2, a path search then occurs for a suitable connecting path to this network interface location. After the definition of such a connecting path within the packet switching network PVN2, the call request is then transmitted via this connecting path and via the network interface location UE2 to the switching equipment Verm2. On the basis of the marking information set in the call request just received, the address information respectively contained in the address field and in the address expansion field are interchanged with one another in this switching equipment. The address information indicating the called subscriber equipment DTE21 is then entered in the address field but the address information indicating the network interface location UE2 is entered in the address expansion field. Following thereupon, the control procedures required for setting up a virtual connection between the switching equipment Verm1 and Verm2 are implemented within the switching equipment Verm2. Among other things, the switching equipment Verm2 thereby generates a call confirmation packet that is supplied to the switching equipment Verm1 via the previously defined alternate route upon involvement of the packet switching network PVN2. This call confirmation packet as well as signalling packets following thereupon and to be exchanged between the switching equipment Verm1 and Verm2 via the defined connecting path thereby correspond to the signalling packets defined in CCITT Recommendation X.75. This concludes the example of the renewed set up of a virtual connection between the subscriber equipment DTE11 and DTE21. Corresponding control procedures also sequence for all other established virtual connections between subscriber equipment of the packet switching network PVN1 when these connections ar to be maintained via an alternate route upon involvement of the packet switching network PVN2 due to a disturbance in the connection.

Moreover, in the above-explained transmission of a call request to the interface location UE1, a call request, in whose address field the address information indicating the called subscriber equipment DTE21 but in whose address expansion field the address information indicating the network interface location UE2 are entered, is first transmitted within the switching equipment Verm1. The address information contained in the address field and in the address expansion field are then interchanged in the network interface location in order to define an alternate route within the packet switching network PVN2 in the above-recited way.

The case can also be present in the above-explained example that certain network-associated performance features defined for the virtual connection that was originally only set up within the packet switching network PVN1 were requested, these being in fact defined within the packet switching network PVN1 but not within the packet switching network PVN2 and that are to be transmitted to the switching equipment Verm2 serving as destination switching equipment in the assumed example. This information deposited in the switching equipment Verm1 and related to performance features are entered in a user data field of the afore-mentioned call request upon definition of an alternate route upon involvement of the packet switching network PVN2. This user data field is first transparently transmitted in the packet switching network PVN2, i.e. no evaluation occurs of the information contained in this user data field. An evaluation of this information occurs only in the switching equipment Verm2 of the packet switching network PVN1 on the basis of the marking information set in the transmitted call request. In addition, information regarding the called subscriber equipment such as, for example, address, line number as well as the virtual channel number defined for the virtual connection now to be maintained on the subscriber line to the called subscriber equipment DTE21 is also transmitted in the user data field. This information is evaluated in the switching equipment Verm2 in order, for example, to transmit data packets to the called subscriber equipment DTE21 under that virtual channel number that had been defined a well for the previously partially cleared down virtual connection after the complete set up of a virtual connection upon involvement of the packet switching network PVN2.

In the above-explained partial clear down of a disturbed virtual connection to the switching equipment Verm1, data packets that have not yet been forwarded in the direction to the called subscriber equipment DTE21 or forwarded data packets that have not yet been acknowledged by the switching equipment Verm2, are transmitted back to the switching equipment Verm1 proceeding from the switching equipment Verm3. The forwarding of these data packets then occurs proceeding from the switching equipment Verm1 after the complete setup of the virtual connection leading over the defined alternate route, namely before data packets are output in the meantime, via the calling subscriber equipment DTE11, as warranted. These are initially intermediately stored in the switching equipment Verm1 until the complete setup of the virtual connection via the alternate route. This procedure assures that the above-described maintaining of a virtual connection via an alternate route occurs without a loss of data packets, so that the above-described control events in the packet switching networks PVN1 and PVN2 do not affect the communication between the subscriber equipment participating in a virtual connection.

Together with the above-explained transmission of data packets via the alternate route upon observation of the original sequence of these data packets, the switching equipment Verm1 and Verm2 are also resynchronized with respect to the transmission and reception counters maintained therein. These transmission and reception counters are incremented with respect to their momentary counter reading in the usual way in the transmission of data packets given an existing virtual connection according to the sequence number respectively contained in these data packets. For example, this can occur in the switching equipment Verm2 with the output of an acknowledgement packet according to CCITT Recommendation X.75 to the switching equipment Verm1 that confirms the reception of a data packet but can also occur in the switching equipment Verm1 with the reception of such an acknowledgement packet. In this way, the transmission and reception counters maintained in the two switching equipment normally have the same momentary counter readings as a result of such an acknowledgement of data packets.

As a result of the above-explained re-establishment of the virtual connection initially conducted within the packet switching network PVN1 upon involvement of the packet switching network PVN2 and as a result of the brief-duration clear down of the appertaining virtual connection connected therewith, the case can also occur that not all data packets that are output proceeding from the switching equipment Verm1 have been acknowledged by the switching equipment Verm2, so that the transmission counter maintained in the switching equipment Verm1 has a momentary counter reading deviating from that of the reception counter maintained in the switching equipment Verm2. A balancing of these momentary counter readings is achieved in that the afore-mentioned data packets transmitted back to the switching equipment Verm1 are again transmitted proceeding from the switching equipment Verm1 in the direction to the switching equipment Verm2, now, namely, via the alternate route upon involvement of the packet switching network PVN2. The switching equipment Verm2 then acknowledges each of these data packets with an afore-mentioned acknowledgement packet, whereby the transmission counter maintained in the switching equipment Verm1 then changes correspondingly. If these data packets were thereby already previously supplied to the switching equipment Verm2 via the original connecting path, they are acknowledged, but then destroyed by the switching equipment Verm2 upon retention of the momentary counter reading of the reception counter.

After the just-cited balancing of the transmission and reception counters in the two switching equipment, data packets supplied to the switching equipment Verm1 proceeding from the calling subscriber equipment DTE11 are again transmitted to the switching equipment Verm2 in the standard way.

Over and above this, dummy packets can be transmitted between the two switching equipment Verm1 and Verm2 proceeding from the switching equipment Verm1 before the afore-mentioned data packets not yet acknowledged by the switching equipment Verm2, the appertaining sequence numbers of these dummy packets, proceeding from a value "0", continuously incrementing up to a value "n-1" when the momentary counter reading of the transmission counter maintained in the switching equipment Verm1 has a value "n" with the setup of the virtual connection via the alternate route. These dummy packets are thereby destroyed in the switching equipment Verm2. It is assured in this way that all switching equipment participating in the virtual connection conducted via the alternate route receive data packets whose appertaining sequence numbers continuously increment from an initial value of "0", as is provided for newly established virtual connections according to CCITT Recommendation X.75.

The above-described method for maintaining virtual connections, moreover, can also be fashioned to such effect that a virtual connection initially conducted via an alternate route upon involvement of the packet switching network PVN2 is continued, when a connecting path within the packet switching network PVN1 is available again, via this internal connecting path. To this end, the fact that a virtual connection is conducted via an alternate route is separately retained in the switching equipment of the packet switching network PVN1 that functions as originating switching equipment for this virtual connection. In the above-explained example, this is the switching equipment Verm1. When information is then present in this switching equipment that the previously down trunk line is again operational, then the above-described virtual connection conducted via an alternate route is, for example, cleared down between originating and destination switching equipment, i.e. between the switching equipment Verm1 and Verm2 in this case. The sub-connections existing between these switching equipment and the subscriber equipment participating in the respective virtual connection, the subscriber equipment DTE11 and DTE21 in this case, are not affected by this partial clear down. Following thereupon, a connecting path within the packet switching network PVN1 to the switching equipment connected to the called subscriber equipment, the switching equipment Verm2 in this case, is defined during the course of another path search based on the address information still stored in the switching equipment Verm1 for the called subscriber equipment DTE21 and a corresponding call request is transmitted via this connecting path. The appertaining call request thereby contains a service signal with which the switching equipment Verm2 is informed that a virtual connection already conducted via an alternate route is merely to be re-established, i.e. that this call request is not to be transmitted to the called subscriber equipment DTE21. In response to this call request, an exchange of signalling packets according to CCITT Recommendation X.75 then occurs between the switching equipment Verm1 and Verm2 in order to again completely set up the previous briefly partially interrupted virtual connection between the subscriber equipment DTE11 and DTE21.

In order to be able to implement such a setup of a virtual connection without data packet losses, data packets not yet acknowledged by the switching equipment Verm2, as has already been set forth in conjunction with the set up of a virtual connection via an alternate route, are again initially transmitted proceeding from the switching equipment Verm1 after the restoration of the virtual connection in order to resynchronize the transmission and reception counters maintained in the two switching equipment Verm1 and Verm2. Dummy packets can thereby also be transmitted proceeding from the switching equipment Verm1 in the above-recited way before the just-cited data packets that have not yet been acknowledged. What is also achieved in this way is that all switching equipment participating in the virtual connection that has now been re-established within the packet switching network PVN1 receive a sequence of data packets whose appertaining sequence numbers continuously increment proceeding from an initial value of "0".

It was assumed above that there are only two network interface locations UE1 and UE2 provided between the two packet switching networks PVN1 and PVN2. However, a separate network interface location can be provided between each of the switching equipment belonging to the packet switching network PVN1 and the packet switching network PVN2. In this case, the address information of the network interface locations of the other switching equipment are deposited in each of the switching equipment of the packet switching network PVN1. When a call setup upon involvement of the packing switching network PVN2 is required, one of the network interface locations is selected based on the address information with which the called subscriber equipment participating in the virtual connection is identified. The address information indicating this network interface location is subsequently transmitted in a call request in the afore-mentioned way. The selected network interface location, for example, is thereby the switching equipment connected to the called subscriber equipment, this switching equipment thus functioning as destination switching equipment for the appertaining, called subscriber equipment.

In conclusion, let it also be pointed out that a backup maintaining of a virtual connection upon involvement of a public packet switching network PVN2 has in fact been set forth above with reference to the example of a virtual connection proceeding between the subscriber equipment DTE11 and DTE21 of a private packing switching network PVN1. The above-described method, however, can always be generally employed when an established virtual connection within a packet switching network is disturbed, for example the outage of trunk lines, and this packet switching network is in communication with another packet switching network via network interface locations.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for maintaining virtual connections existing between calling subscriber equipment and called subscriber equipment of a first packet switching network given at least a partial outage of connecting paths defined for the virtual connections within the first packet switching network, individual connecting paths proceeding via a plurality of switch equipment of the first packet switching network and at least one network interface location being respectively provided at least between switching equipment connected to the subscriber equipment and a second packet switch network, comprising the steps of:

storing at least one address information indicating a network interface location for a reentry into the first packet switching network in each of the switching equipment connected to the subscriber equipment of the first packet switching network;

only clearing down, given outage of a connecting path within the first packet switching network, the virtual connection respectively conducted over this connecting path associated with the outage to the switching equipment participating in this virtual connection associated with the outage and connected to the calling subscriber equipment and to the called subscriber equipment; request requesting a setup of a virtual connection proceeding from the switching equipment connected to the calling subscriber equipment and transmitting the call request to the second packet switching network via the network interface location connected to the appertaining switching equipment, an address expansion field being provided in the call request in addition to an address field and defined marking information being set;

entering in the address field of the call request at least after the appertaining network interface location for the virtual connection now to be set up to in the address field in the transmitted call request and entering address information indicating the called subscriber equipment participating in the virtual connection just partially cleared down in the address expansion field;

defining based on the address information contained in the addressed field of the call request that indicates the network interface location for the reentry into the first packet switching network, a connecting path to the appertaining network interface location in the second packet switching network and conducting the call request thereto;

interchanging, on the basis of a marking information set in the call request, the address information that is respectively contained in the appertaining address field, and in address expansion field with one another at the appertaining network interface location; and setting up, based on the address information now contained in the address field of the call request that indicates the called subscriber equipment, the virtual connection requested with the call request to the switching equipment connected to the appertaining, called subscriber equipment.

2. The method according to claim 1, wherein a network interface location is provided between each of the switching equipment of the first packet switching network and the second packet switching network; wherein respective address information with respect to all network interface locations for a reentry into the first packet switching network are stored in the switching equipment of the first packet switching network; and wherein a network interface location for the reentry into the first packet switching network is selected for generating a call request by the switching equipment of the call subscriber equipment and based on the address information indicating the called subscriber equipment and the address information indicating this network interface location is transferred into the call request to be generated.

3. The method according to claim 1, wherein performance feature information, appertaining to a partially cleared down virtual connection which is retained for the appertaining virtual connection in the switching equipment generating a call request and that is to be transmitted to the switching equipment of the first packet switching network connected to the called subscriber equipment, is inserted into a user data field of the call request.

4. The method according to claim 1, wherein the first packet switching network is a private packet switching network and the second packet switching network is a public packet switching network.

5. A method for maintaining virtual connections existing between calling subscriber equipment and called subscriber equipment of a first packet switching network given at least a partial outage of connecting paths defined for the virtual connections within the first packet switching network, individual connecting paths proceeding via a plurality of switching equipment of the first packet switching network and a plurality of network interface locations being provided such that a network interface location is respectively provided between each of the switching equipment connected to subscriber equipment and a second packet switching network, comprising the steps of:

storing address information indicating all network interface locations for a reentry into the first packet switching network in each of the switching equipments connected to the subscriber equipment of the first packet switching network;

only clearing down, given outage of a connecting path within the first packet switching network, the virtual connection respectively conducted over this connecting path associated with the outage to the switching equipment participating in this virtual connection associated with the outage and connected to the calling subscriber equipment and to the called subscriber equipment;

generating, in response to such a partial clear down, a call request requesting a setup of a virtual connection proceeding from the switching equipment connected to the calling subscriber equipment, selecting a network interface location for the reentry into the first packet switching network based on the address information indicating the called subscriber equipment, the address information indicating the selected network interface location being transferred into the call request, and transmitting the call request to the second packet switching network via the selected network interface location connected to the appertaining switching equipment, an address expansion field being provided in the call request in addition to an address field and defined marking information being set;

entering in the address field of the call request at least after the appertaining network interface location, address information indicating the network interface location for the virtual connection now to be set up in the address field in the transmitted call request and entering the address information indicating the called subscriber equipment participating in the virtual connection just partially cleared down in the address expansion field;

defining based on the address information contained in the addressed field of the call request that indicates the selected network interface location for the reentry into the first packet switching network, a connecting path to the selected network interface location in the second packet switching network and conducting the call request thereto;

interchanging, on the basis of a marking information set in the call request, the address information that is respectively contained in the appertaining address field, and in address expansion field with one another at the selected network interface location;

setting up, based on the address information now contained in the address field of the call request that indicates the called subscriber equipment, the virtual connection requested with the call request to the switching equipment connected to the appertaining, called subscriber equipment.

6. The method according to claim 5, wherein performance feature information, appertaining to a partially cleared down virtual connection which is retained for the appertaining virtual connection in the switching equipment generating a call request and that is to be transmitted to the switching equipment of the first packet switching network connected to the called subscriber equipment, is inserted into a user data field of the call request.

7. The method according to claim 5, wherein the first packet switching network is a private packet switching network and the second packet switching network is a public packet switching network.

8. A method for maintaining virtual connections existing between calling subscriber equipment and called subscriber equipment of a first packet switching network given at least a partial outage of connecting paths defined for the virtual connections within the first packet switching network, individual connecting paths proceeding via a plurality of switching equipment of the first packet switching network and a plurality of network interface locations being provided such that a network interface location is respectively provided between each of the switching equipment connected to subscriber equipment and a second packet switching network, comprising the steps of:

storing address information indicating all network interface locations for a reentry into the first packet switching network in each of the switching equipments connected to the subscriber equipment of the first packet switching network;

only clearing down, given outage of a connecting path within the first packet switching network, the virtual connection respectively conducted over this connecting path associated with the outage to the switching equipment participating in this virtual connection associated with the outage and connected to the calling subscriber equipment and to the called subscriber equipment;

generating, in response to such a partial clear down, a call request requesting a setup of a virtual connection proceeding from the switching equipment connected to the calling subscriber equipment, selecting a network interface location for the reentry into the first packet switching network based on the address information indicating the called subscriber equipment, the address information indicating the selected network interface location being transferred into the call request, transmitting the call request to the second packet switching network via the selected network interface location connected to the appertaining switching equipment, an address expansion field being provided in the call request in addition to an address field and defined marking information being st, and inserting performance feature information, appertaining to a partially cleared down virtual connection which is retained for the appertaining virtual connection in the switching equipment generating a call request and that is transmitted to the switching equipment of the first packet switching network connected to the called subscriber equipment, into a user data field of the call request;

entering in the address field of the call request at least after the appertaining network interface location, address information indicating the network interface location for the virtual connection now to be set up in the address field in the transmitted call request and entering the address information indicating the called subscriber equipment participating in the virtual connection just partially cleared down in the address expansion field;

defining based on the address information contained in the addressed field of the call request that indicates the selected network interface location for the reentry into the first packet switching network, a connecting path to the selected network interface location in the second packet switching network and conducting the call request thereto;

interchanging, on the basis of a marking information set in the call request, the address information that is respectively contained in the appertaining address field, and in address expansion field with one another at the selected network interface location;

setting up, based on the address information now contained in the address field of the call request that indicates the called subscriber equipment, the virtual connection requested with the call request to the switching equipment connected to the appertaining, called subscriber equipment.

9. The method according to claim 8, wherein the first packet switching network is a private packet switching network and the second packet switching network is a public packet switching network.

* * * * *